(12) United States Patent
Park et al.

(10) Patent No.: US 6,996,327 B1
(45) Date of Patent: Feb. 7, 2006

(54) METHOD FOR GENERATING ADDITIONAL INFORMATION FOR GUARANTEEING SEAMLESS PLAYBACK BETWEEN DATA STREAMS, RECORDING MEDIUM STORING THE INFORMATION, AND RECORDING, EDITING AND/OR PLAYBACK APPARATUS USING THE SAME

(75) Inventors: Sung-wook Park, Seoul (KR); Seong-jin Moon, Seoul (KR); Bong-gil Bak, Seoul (KR); Jung-kwon Heo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/461,292

(22) Filed: Dec. 15, 1999

(30) Foreign Application Priority Data

Dec. 16, 1998 (KR) ............................... 1998-55500
Jan. 14, 1999 (KR) .................................. 1999-840

(51) Int. Cl.
*H04N 5/91* (2006.01)

(52) U.S. Cl. .................... 386/95; 386/112; 386/125; 386/126

(58) Field of Classification Search ................ 386/46, 386/95, 98, 111, 112, 125, 126, 92
See application file for complete search history.

(56) References Cited

U.S. PATENT DOCUMENTS

| 5,854,873 | A | * | 12/1998 | Mori et al. .................... 386/92 |
| 5,923,869 | A | * | 7/1999 | Kashiwagi et al. .......... 713/501 |
| 6,181,870 | B1 | * | 1/2001 | Okada et al. .................. 386/95 |
| 2002/0150392 | A1 | * | 10/2002 | Yoo et al. .................... 386/111 |

FOREIGN PATENT DOCUMENTS

| CN | 1197573 A | 10/1998 |
| EP | 0 634 867 A | 1/1995 |
| EP | 0 731 606 A | 9/1996 |
| EP | 0 847 195 A | 6/1998 |
| EP | 0847195 A1 | 6/1998 |
| JP | 08-195072 | 7/1996 |
| JP | 09-139914 | 5/1997 |
| JP | 10-164512 | 6/1998 |

* cited by examiner

*Primary Examiner*—Huy Nguyen
(74) *Attorney, Agent, or Firm*—Stein, McEwen & Bui, LLP

(57) ABSTRACT

A method for generating additional information for guaranteeing seamless playback of data streams, a recording medium for storing the information, and recording, editing and/or playback apparatus using the same are provided. The method generates additional information for guaranteeing seamless playback. The method includes a step of generating data stream information for each of two or more data streams, which includes packet data to which information on an arrival time of the respective packet data is added. The data stream information includes seamless playback information, which indicates whether a corresponding data stream is to be seamlessly reproduced after playback of a preceding data stream, and/or seamless time control information for controlling an output time of the corresponding data stream to be seamlessly reproduced. Therefore, data streams can be seamlessly reproduced without interruption between the data streams, by using data stream information which includes seamless information and/or seamless time control information including reference time, an offset value and/or a gap length value. Especially, by using the information structure, even if data streams are edited, the data streams can be seamlessly reproduced in such a simple manner of just modifying data stream information, instead of directly rewriting or modifying arrival time information which is added to packet data.

16 Claims, 11 Drawing Sheets

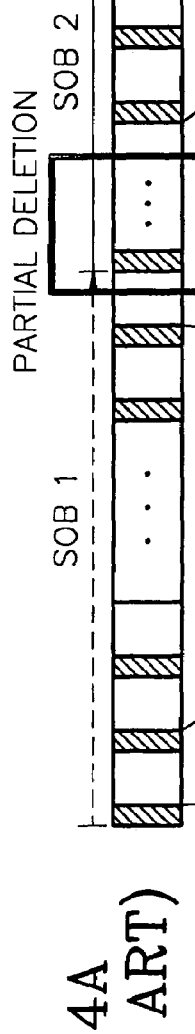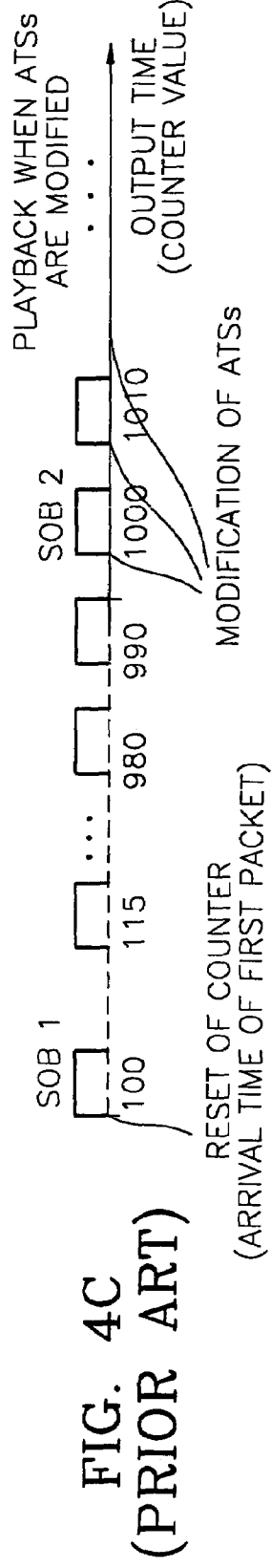
FIG. 4A (PRIOR ART)
FIG. 4B (PRIOR ART)
FIG. 4C (PRIOR ART)

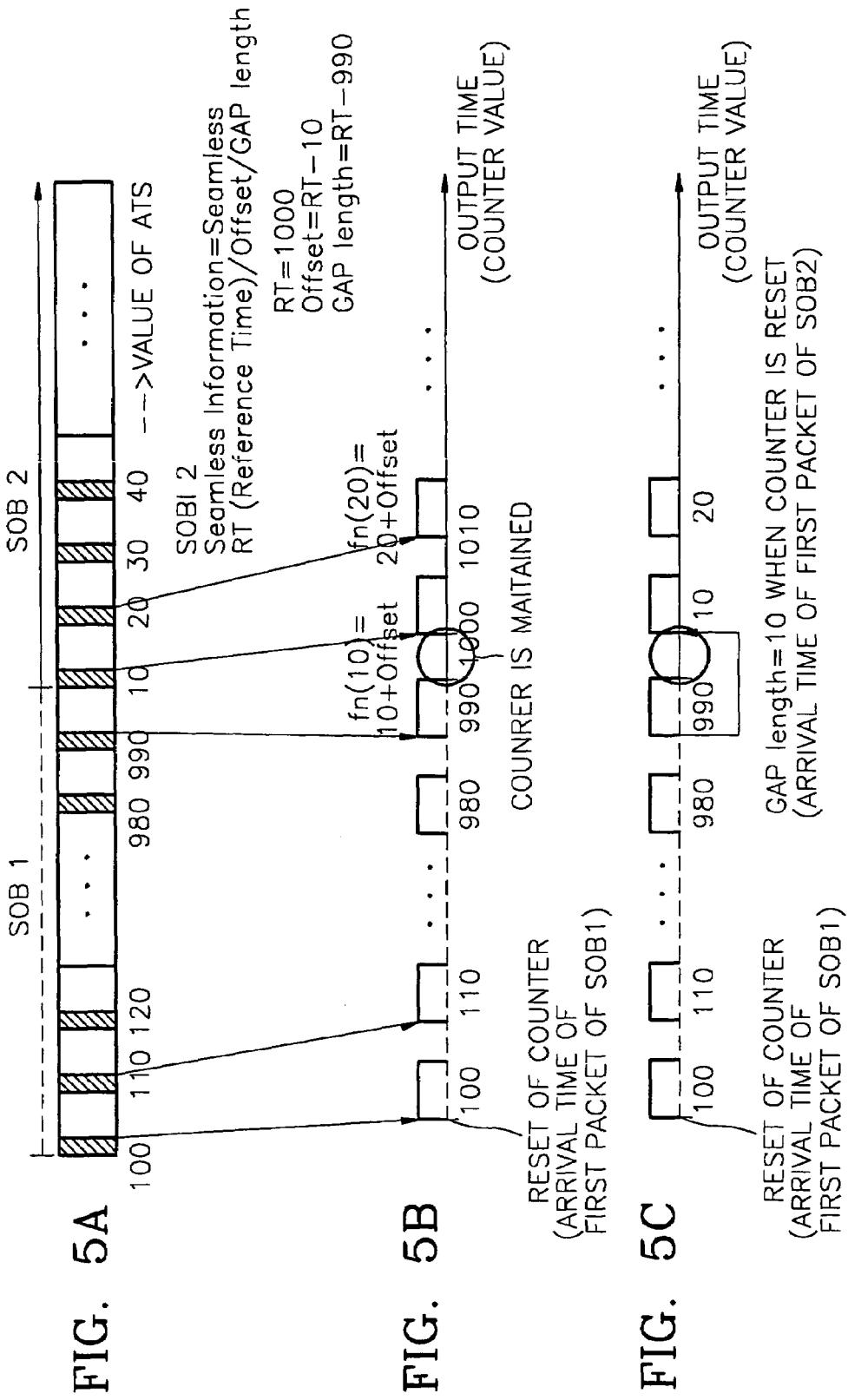

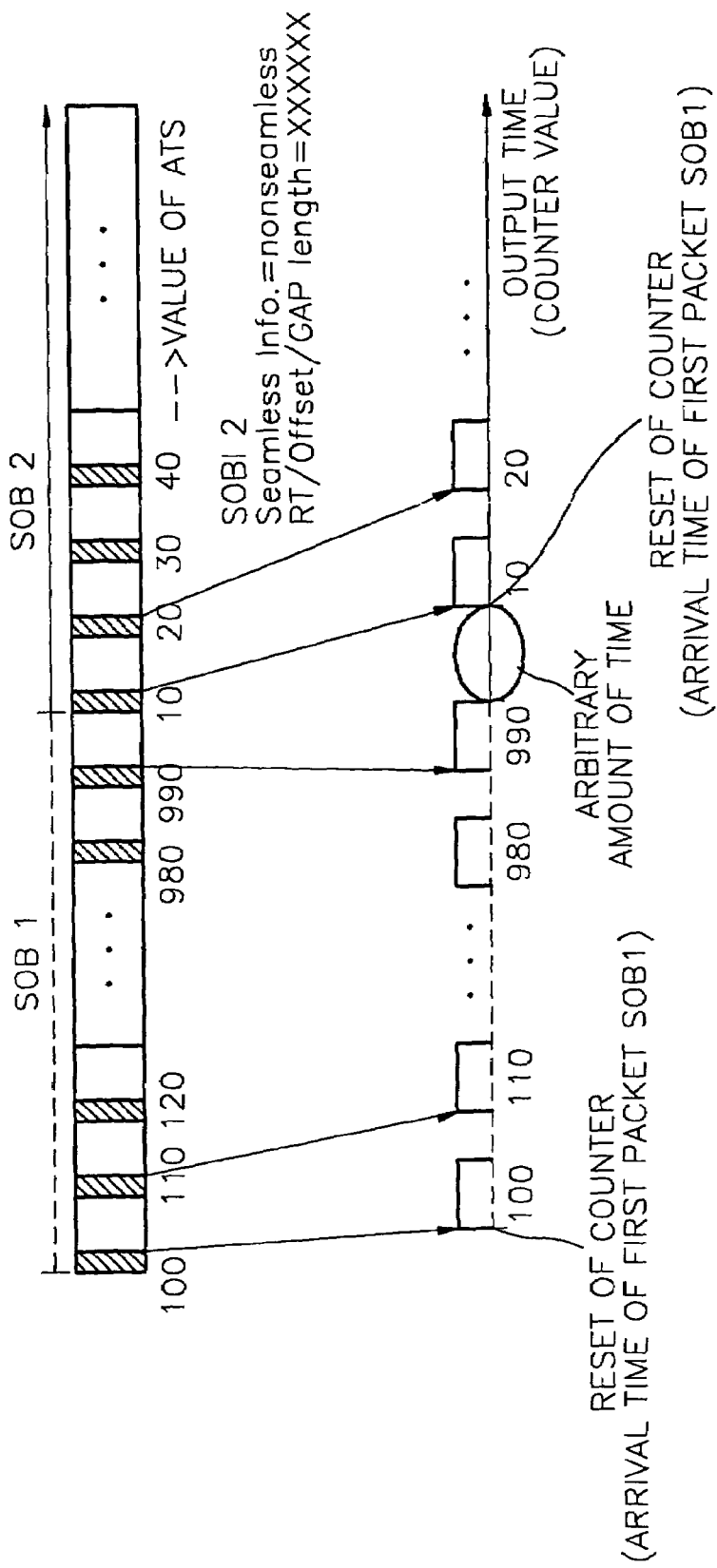

METHOD FOR GENERATING ADDITIONAL INFORMATION FOR GUARANTEEING SEAMLESS PLAYBACK BETWEEN DATA STREAMS, RECORDING MEDIUM STORING THE INFORMATION, AND RECORDING, EDITING AND/OR PLAYBACK APPARATUS USING THE SAME

CROSS-REFERENCE TO RELATED APPLICATIONS

This application claims the benefit of Korean Application Nos. 98-55500, filed Dec. 16, 1998 and Korean Application No. 99-840, filed Jan. 14, 1999, in the Korean Patent Office, the disclosures of which are incorporated herein by reference.

BACKGROUND OF THE INVENTION

1. Field of the Invention

The present invention relates to recording and/or playback of digital data, and more particularly, to a method for generating additional information for guaranteeing seamless playback between data streams which are composed of packetized data, a recording medium for storing the information, and a recording, editing and/or playback apparatus using the same.

2. Description of the Related Art

Packet data is usually used in digital satellite broadcasting, digital terrestrial broadcasting, digital cable broadcasting and asynchronous transfer mode (ATM) transmission networks. FIG. 1 shows the basic form of recorded data composed of input packet data and its arrival time and the conceptional relation between the recorded data and data output time intervals during playback. When recording input data, an arrival time stamp (ATS), which is arrival time information, is added to the input data and the data is output based on the added ATS during playback. Here, the input data is packetized data which is obtained by dividing data such as video or audio into units of a predetermined size. The packetized data is transmitted through satellites, cables or local area networks (LANs). The size of the unit is 188 bytes when data is transmitted using a Moving Picture Experts Group (MPEG)-2 transport stream defined by International Organization for Standardization (ISO)/International Electrotechnical Commission (IEC) 13818-1 standard, and is 53 bytes when data is transmitted using an asynchronous transfer mode (ATM) standard.

In digital broadcasting, packet data is transmitted at irregular time intervals. The transmitted packet data is usually received by a receiving party having a decoder. In the receiving party, the transmitted data is input into the decoder via a buffer and decoded by the decoder so that users can watch the broadcasting.

When a user sets a playback mode to reproduce, at a desired time, packet data, which has been temporarily stored in a recording medium, the packet data is sent to the decoder by a playback apparatus. When sending the data to the decoder, the irregular time intervals at which the packet data was originally transmitted to the receiving party are significant because the buffer of the receiving party overflows or underflows if the irregular time intervals are not obeyed. This is because, when transmitting data, an original transmitting party (a broadcasting station) adjusts the time intervals between packet data taking into account the state of the buffer of a receiving party having a decoder. For this reason, it is assumed that information on the arrival time of each packet of data is added to each corresponding packet of input data when a recording apparatus records data, and each packet of data is output by a playback apparatus based on the arrival time information thereof.

FIG. 2 is a block diagram showing a recording and playback apparatus for the packet data shown in FIG. 1. In FIG. 2, a counter 102, which operates according to a system clock signal, usually uses a system clock signal of 27 MHz because the MPEG-2 system generates time stamps on the basis of a clock signal of 27 MHz. It is needless to say that a system clock signal of another frequency can be used.

An ATS generator 104 adds an ATS to each packet of input data. The input packet data together with the added ATSs is converted into a signal suitable for recording by a recording controller 106 and then recorded in a recording medium 108. A playback controller 110 plays back the packet data to which ATSs have been added, which is recorded in the recording medium 108, and sends the playback data to an ATS processor 112. The ATS processor 112 outputs the data according to the added ATS of the playback data. Here, the ATS generator 104 and the ATS processor 112 each includes an internal buffer. Alternately, the buffers of the ATS generator 104 and the ATS processor 112 may be separately provided on the outside.

In the method of adding an ATS, during recording, the ATS generator 104 reads a count value of the counter 102 at the time when packet data is input, and adds the count value to the packet as an ATS. The packet data with the added ATS is temporarily stored in the internal buffer of the ATS generator 104 and then recorded in the recording medium 108 via the recording controller 106. As mentioned above, the internal buffer can be separately provided on the outside.

During playback, the playback controller 110 plays back the packet data with the added ATS from the recording medium 108 and sends the playback data to the ATS processor 112. The ATS processor 112, which includes a buffer of a predetermined size, temporarily stops reading data when the buffer overflows, and restarts the reading when the buffer is empty, repeatedly. The ATS processor 112 reads the ATS and corresponding packet data of a first packet, from its internal buffer, and sets the counter 102 based on the ATS while outputting the packet data. The output data of the ATS processor 112 is pure packet data from which the ATS has been removed. Thereafter, packet data is output only when the added ATS of the packet is determined to have the same value as the count value of the counter 102 by comparing the ATS with the count value. The buffer included in the ATS processor 112 may also be separately provided on the outside. Due to such configuration and operation as described above, data can be transmitted to a receiving party having a decoder while the original time intervals of packet data are maintained during playback so that decoding can be smoothly performed.

As shown in FIGS. 1 and 2, when recording packet data, an ATS, which indicates the arrival time of the corresponding packet data, is added to the packet data. A data stream which is recorded in such a manner is referred to as a stream object (SOB). A plurality of SOBs may be recorded in a single recording medium. For example, when a user starts and stops recording one time, one SOB is generated. Thereafter, if the user starts and stops recording again, another SOB is generated. A data stream is data which is recorded starting from the time when a user starts recording through the time when the user stops recording. For example, a piece of drama or movie can be recorded in the form of a single data stream.

An ATS is important in an apparatus for recording packet data. Generally, ATSs are added to a data stream, independently from those which are added to other data streams. The independent method is possible when seamless playback is required only with respect to a single data stream. However, when a user desires to seamlessly reproduce two or more data streams, additional information for defining the seamless playback between the data streams is needed.

FIG. 3 shows an example in which two data streams are reproduced by the recording and playback apparatus shown in FIG. 2. In a preceding data stream, SOB 1, the values of ATSs are written from "100" to "990." In a succeeding data stream SOB 2, the values of ATSs are written starting from "0." This is because, the ATS generator 104 sets an initial value to "100," which is the value of the ATS of packet data which arrives first in the SOB 1, and records the SOB 1 during the recording of the SOB 1 while the ATS generator 104 sets an initial value to "0," which is the value of the ATS of packet data which arrives first in the SOB 2, regardless of the values of the ATSs in the SOB 1, and records the SOB 2 during the recording of the SOB 2. When sequentially reproducing the two data streams which have been recorded through the above operation, the value of the counter 102 is compared with the values of ATSs of the SOB 1 during the playback of the SOB 1 and, after completing the playback of the SOB 1, the counter 102 is reset to "0" to reproduce the SOB 2.

In the operation of sequentially reproducing the two data streams, SOB 1 and SOB 2, information for defining the seamless playback between the SOB 1 and the SOB 2, for example, the time interval between the end of playback of the SOB 1 and the start of playback of the SOB 2, is not defined. In other words, as shown in FIG. 3, a single SOB is reproduced in such a manner that the counter 102 is reset to the value of the ATS of the first packet data of SOB 1 and then the value of ATSs of packet data are compared with the count value of the counter 102 until an ATS having the same value as that of the counter 102 is searched, so as to output packet data to which the searched ATS has been added. Once the playback of the SOB 1 is completed, the playback of the SOB 2 is performed in the same manner as in the playback of the SOB 1 after the counter 102 is reset to the value of the ATS of the first packet of the SOB 2. At this time, the seamless playback between the SOB 1 and the SOB 2 is not particularly defined so that the playback operation is usually stopped for a short time.

When sequentially reproducing SOBs, the time intervals between SOBs cannot be equally fixed because the time intervals depend on internal data states. Accordingly, information on playback time control in accordance with the internal data states is needed. Without this information, seamless playback cannot be guaranteed and a small time delay appears between two SOBs.

FIG. 4A shows a case in which ATSs are added to the plurality of SOBs for the purpose of seamless playback and shows a discontinuous section which is caused by partial deletion of data. In other words, during recording, instead of adding ATSs to SOB 2 independently from those in SOB 1, the ATSs are added to SOB 2 taking into account the value of the last ATS of SOB 1 and a current data state so that seamless playback can be achieved. During playback, the counter 102 is not reset between the two SOBs and the playback of the two SOBs is performed as though a single SOB is being reproduced, thereby guaranteeing automatic seamless playback. In this case, the two SOBs are seamlessly reproduced according to the ATSs without resetting of the counter 102 between the two SOBs during playback.

However, seamless playback may not be guaranteed when partial deletion, which occurs frequently in using a recording and playback apparatus, is performed.

For example, if a portion of SOB 2 is deleted at the boundary between the SOB 1 and the SOB 2, output of data, as shown in FIG. 4B, is not performed for a period of time corresponding to the amount of deleted data. This is because the value of the counter 120 is not reset at the boundary between the two SOBs. If the counter 102 is reset to the value of the ATS of the first packet of SOB 2, the problem can be solved, but there occurs a problem that the seamless playback between two SOBs is not defined as shown in FIG. 3.

In another method, as shown in FIG. 4C, all the ATSs of the SOB 2 are modified into values for allowing seamless playback. However, it is troublesome to modify all the ATSs of SOB 2 during recording.

In brief, when sequentially reproducing the two data streams, SOB 1 and SOB 2, to which the ATSs are independently added as shown in FIG. 3, the ATS processor 112 resets the counter 102 to the value of the first ATS of the SOB 2 immediately after a predetermined amount of time has passed since the playback of the SOB 1 was completed, and starts the playback of the SOB 2. Consequently, seamless playback is not guaranteed and playback is interrupted.

Even if the ATS generator 104 generates ATSs for allowing seamless playback when recording the SOB 2 after completing the recording of the SOB 1 as shown in FIG. 4A, seamless playback is impossible when editing is performed, that is, a portion of the SOB 1 or SOB 2 is deleted at the boundary between the two SOBs. According to the method as shown in FIG. 4C, it is difficult to modify the values of the ATSs of the SOB 2 after recording or editing and to record the modified values again.

SUMMARY OF THE INVENTION

To solve the above problems, it is an objective of the present invention to provide a method for generating additional information for guaranteeing that a plurality of data streams composed of packet data, which is used in digital satellite broadcasting, digital terrestrial broadcasting, digital cable broadcasting and asynchronous transfer mode (ATM) networks, are recorded in a storage medium such as an optical disk and that the data streams are seamlessly reproduced.

It is another objective of the present invention to provide a recording medium in which updated additional information is stored so as to guarantee that seamless playback of a plurality of data streams, each of which is composed of packet data, is easily achieved even after editing such as performing a partial deletion of the plurality of data streams.

It is yet another objective of the present invention to provide a recording apparatus for recording additional information, which guarantees seamless playback of a plurality of data streams composed of packet data, during recording operation.

It is still yet another objective of the present invention to provide an editing apparatus for easily updating additional information, which guarantees seamless playback of a plurality of data streams composed of packet data, during an editing operation such as partial deletion.

It is another objective of the present invention to provide a playback apparatus for performing seamless playback at the boundaries between a plurality of data streams composed of packet data, using additional information for guaranteeing seamless playback during playback operation.

It is further another objective of the present invention to provide a recording and playback apparatus for recording additional information, which guarantees seamless playback of a plurality of data streams composed of packet data, and performing seamless playback at the boundaries between the plurality of data streams based on the additional information.

Accordingly, to achieve the above objectives, there is provided a method for generating additional information. The method includes a step of generating data stream information for each of two or more data streams, which includes packet data to which information on an arrival time of the respective packet data is added. The data stream information includes seamless playback information, which indicates whether a corresponding data stream is to be seamlessly reproduced after playback of a preceding data stream, and/or seamless time control information for controlling an output time of the corresponding data stream to be seamlessly reproduced.

In another aspect of the present invention, there is provided a recording medium including a first area including a plurality of data streams composed of packet data to which information on the arrival time of the respective packet data is added; and a second area including data stream information comprising seamless information, which indicates whether a corresponding data stream is to be seamlessly reproduced after playback of a preceding data stream, and/or seamless time control information for controlling an output time of the corresponding data stream to be seamlessly reproduced.

In yet another aspect, there is provided a recording apparatus including an arrival time information generator for adding arrival time information on an arrival time of input packet data to each input packet data; a data stream information generator for generating data stream information for each of two or more data streams including the packet data to which the arrival time information of the respective packet data is added, the data stream information having seamless playback information, which indicates whether a corresponding data stream to be seamlessly reproduced after playback of a preceding data stream, and/or seamless time control information for controlling an output time of the corresponding data stream to be seamlessly reproduced; and a recording controller for performing control such that the data stream is recorded in a first area of a recording medium and the data stream information is recorded in a second area of the recording medium.

In still yet another aspect, there is provided an editing apparatus for editing data* recorded in a recording medium including a first area having a plurality of data streams composed of packet data to which information on the arrival time of the respective packet data is added; and a second area including data stream information having seamless information, which indicates whether a corresponding data stream is to be seamlessly reproduced after playback of a preceding data stream, and/or seamless time control information for controlling an output time of the corresponding data stream to be seamlessly reproduced. The editing apparatus includes a data information updator for, after editing by the editing apparatus, analyzing the data stream information and updating the seamless time control information so that data at either side of the boundary between data streams, at which seamless playback is not guaranteed, can be seamlessly played back; and an editing controller for performing control such that edited data streams are recorded in a first area of the recording medium and updated data stream information is recorded in a second area of the recording medium.

In another aspect, there is provided a playback apparatus for reproducing data recorded in a recording medium including a first area including a plurality of data streams composed of packet data to which information on the arrival time of the respective packet data is added; and a second area including data stream information including seamless information, which indicates whether a corresponding data stream is to be seamlessly reproduced after playback of a preceding data stream, and/or seamless time control information for controlling an output time of the corresponding data stream to be seamlessly reproduced. The playback apparatus includes a playback controller for reproducing the data streams and data stream information which are recorded in the recording medium; a counter which is driven by a system clock signal and reset according to arrival time information which has been added to a packet that is first reproduced by the playback controller; a first processor for modifying the original arrival time information of a corresponding data stream to be seamlessly reproduced so as to provide modified arrival time information or for providing a control signal indicating a time when the counter is to be reset, based on data stream information provided from the playback controller; and a second processor for controlling output by removing the original arrival time information which is added to the packet data in the corresponding data stream, which is provided from the playback controller, in response to an output of the first processor.

In further another aspect, there is provided a recording and playback apparatus including an arrival time information generator for adding arrival time information on an arrival time of input packet data to each input packet data; a data stream information generator for generating data stream information for each of two or more data streams including the packet data to which the arrival time information of the respective packet data is added, the data stream information having seamless playback information, which indicates whether a corresponding data stream to be seamlessly reproduced after playback of a preceding data stream, and/or seamless time control information for controlling an output time of the corresponding data stream to be seamlessly reproduced; a recording controller for performing control such that the data stream is recorded in a first area of a recording medium and the data stream information is recorded in a second area of the recording medium; a playback controller for reproducing the data streams and data stream information which are recorded in the recording medium; a counter which is driven by a system clock signal, the counter being reset at the moment when each data stream is input and performing counting operation to provide a count value to the arrival time information generator, during recording, the counter being reset according to arrival time information which is added to a packet which is first reproduced by the playback controller, during playback; a first processor for modifying original arrival time information of a corresponding data stream to be seamlessly reproduced so as to provide modified arrival time information or for providing a control signal indicating a time when the counter is to be reset, based on data stream information provided from the playback controller; and a second processor for controlling output by removing the original arrival time information which is added to the packet data in the corresponding data stream, which is provided from the playback controller, in response to an output of the first processor.

BRIEF DESCRIPTION OF THE DRAWINGS

The above objectives and advantages of the present invention will become more apparent by describing in detail preferred embodiments thereof with reference to the attached drawings in which:

FIGS. 4A, 4B and 4C are views for explaining another example of a conventional method for reproducing at least two SOBs;

FIGS. 5A, 5B and 5C are views for showing an example of seamless playback between two SOBs when seamless information according to the present invention indicates "seamless playback;"

FIG. 6 is a view for showing an example of discontinuous playback between two SOBs when seamless information according to the present invention indicates "non-seamless playback;"

DETAILED DESCRIPTION OF THE INVENTION

Figure 1:
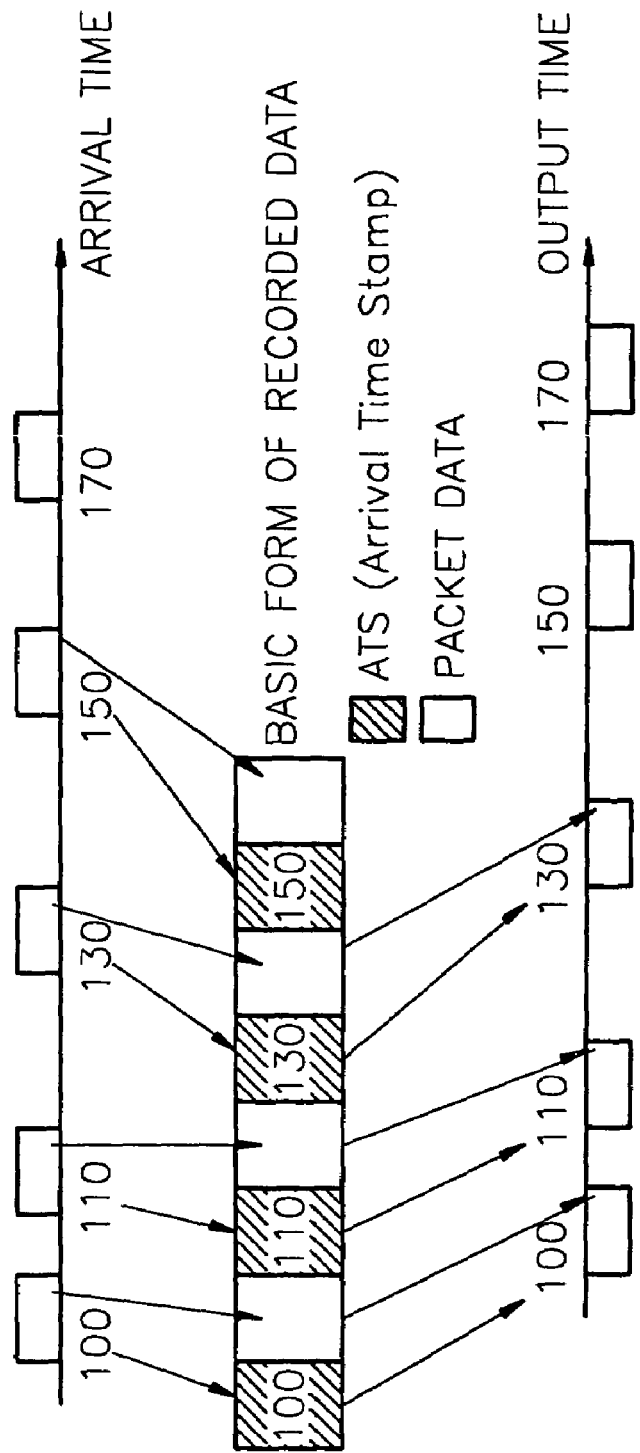
FIG. 1 shows the basic form of recorded data, which is composed of input packet data and its arrival time information, and the conceptional relation between the recorded data and data output time intervals during playback.
Figure 2:
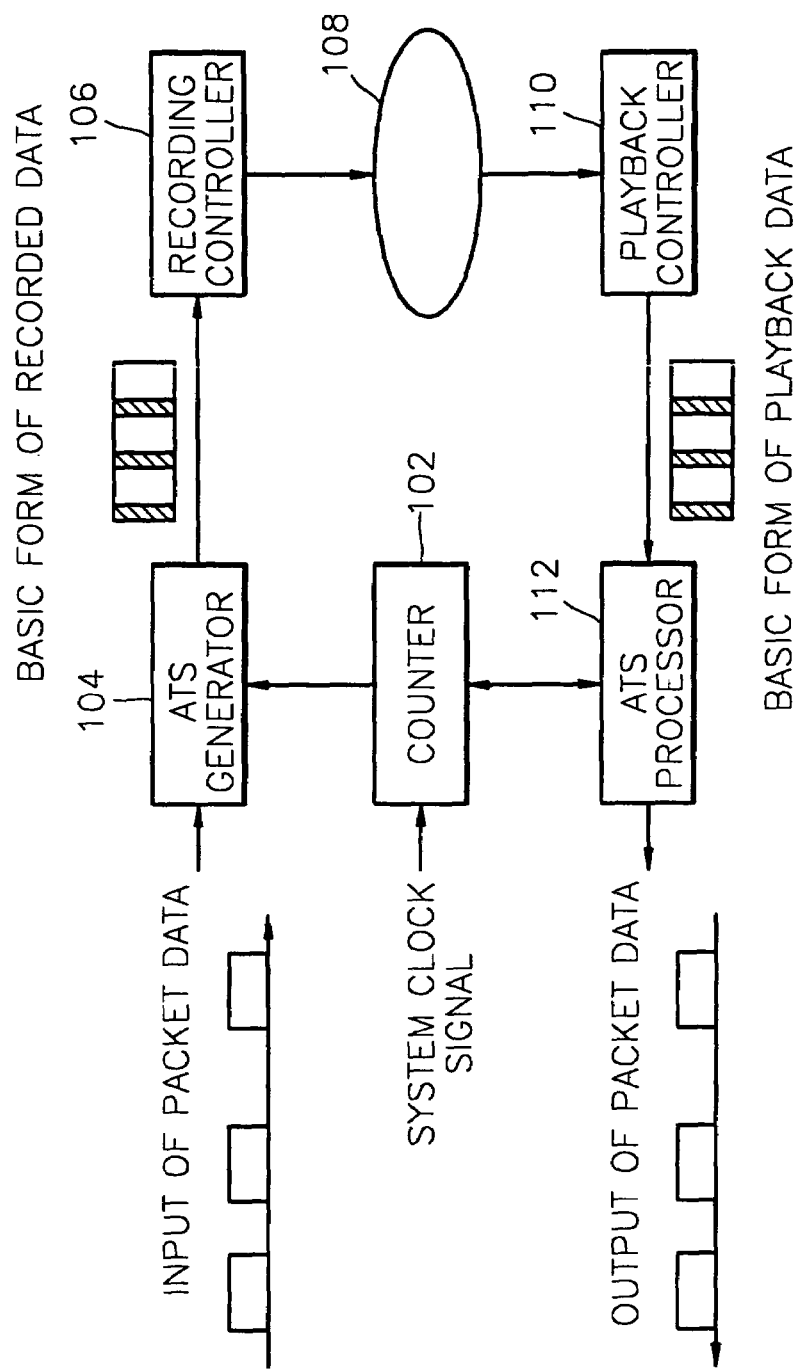
FIG. 2 is a block diagram showing a recording and playback apparatus for the packet data shown in FIG. 1.

The present invention relates to a method for generating additional information while recording data streams composed of packet data, a recording medium for storing the generated additional information along with the data streams, a recording apparatus for recording the additional information along with the data streams, an editing apparatus for updating the additional information to guarantee seamless playback after editing, and a playback apparatus for performing seamless playback based on the additional information. In describing packet data in the present invention, for illustrative purpose, an input data stream is assumed to be in an MPEG2-TS format. Meanwhile, since the present invention guarantees accurate transfer timing at boundaries between data streams for seamless playback, the present invention can be referred to as "seamless transfer" for seamless playback. The seamless transfer is essential to seamlessly reproduce data streams composed of packet data.

FIG. 5A shows two data streams in a case where seamless information according to the present invention indicates "seamless playback." In the present invention, information on data streams is separately created for each data stream and used for seamless playback of the data streams. The information on each data stream is referred to as "data stream information," that is, stream object information (SOBI). The SOBI includes seamless information, which indicates whether seamless playback is to be performed, and seamless time control information, which includes a reference time (RT), an offset value and/or a gap length value used during seamless playback.

The seamless information indicates whether seamless playback between two data streams, SOB 1 and SOB 2, is to be guaranteed, that is, whether the seamless time control information (RT/offset/gap length) is to be used. The seamless information may be represented by a one bit flag in the simplest form or may be implied by the value of the seamless time control information without a particular form of information. For example, if the values of the seamless time control information are all "0," non-seamless playback is implied. If not, seamless playback is implied. In addition, when seamless playback can be performed without the seamless time control information, just the seamless information may be used to indicate whether seamless playback is guaranteed for corresponding data streams.

In playback, when the seamless information indicates "seamless playback," after reproducing the preceding data stream, SOB 1, a playback apparatus modifies the values of ATSs of the succeeding data stream, SOB 2, based on the seamless time control information (RT/offset/gap length) and reads the properly modified values so as to reproduce SOB 2. The values of RT/offset/gap length are used to sequentially continue ATSs when seamlessly reproducing SOB 1 and SOB 2. The correlation among the three values is expressed as follows:

Offset=RT−ATS of first packet of SOB 2

Gap length=RT−ATS of last packet of SOB 1.

For example, when the count value of a counter is maintained, i.e., not reset, after completing the playback of SOB 1, an output time of the first packet of the SOB 2 may be determined based on the RT which indicates a time when the first packet of SOB 2 must be output. Alternately, assuming that the difference between the original value of the ATS of the first packet of SOB 2 and a modified value of the ATS is an offset, the time when the first packet of the SOB 2 must be output is determined based on the offset value. The offset value may be a positive or negative number. Thereafter, the offset value is added to the original values of the ATSs of the packets in SOB 2 so that the original values of the ATSs are modified into new values. Alternately, when the count value of the counter is reset after the completion of the playback of the SOB 1, the value of the gap length from the completion of output of the last packet of the SOB 1 to the start point of the output of the first packet of the SOB 2, may be used. No matter which of the three values of the seamless time control information is used, the same output time is obtained for the first packet of the SOB 2.

In FIG. 5B, the first packet of SOB 2 is output at the time 1000 while counting operation is maintained, i.e., the counter is not reset, after completing output of the SOB 1. In FIG. 5C, immediately after the value of a gap length, 10, has passed since the arrival time 990 of the last packet of SOB 1, the value of the counter is reset to the value of an arrival time of the first packet of SOB 2. Thereafter, the SOB 2 is output according to its ATSs as they are. In the playback methods shown in FIGS. 5B and 5C, the packet data of SOB 2 is output at the same output time.

Figure 3:
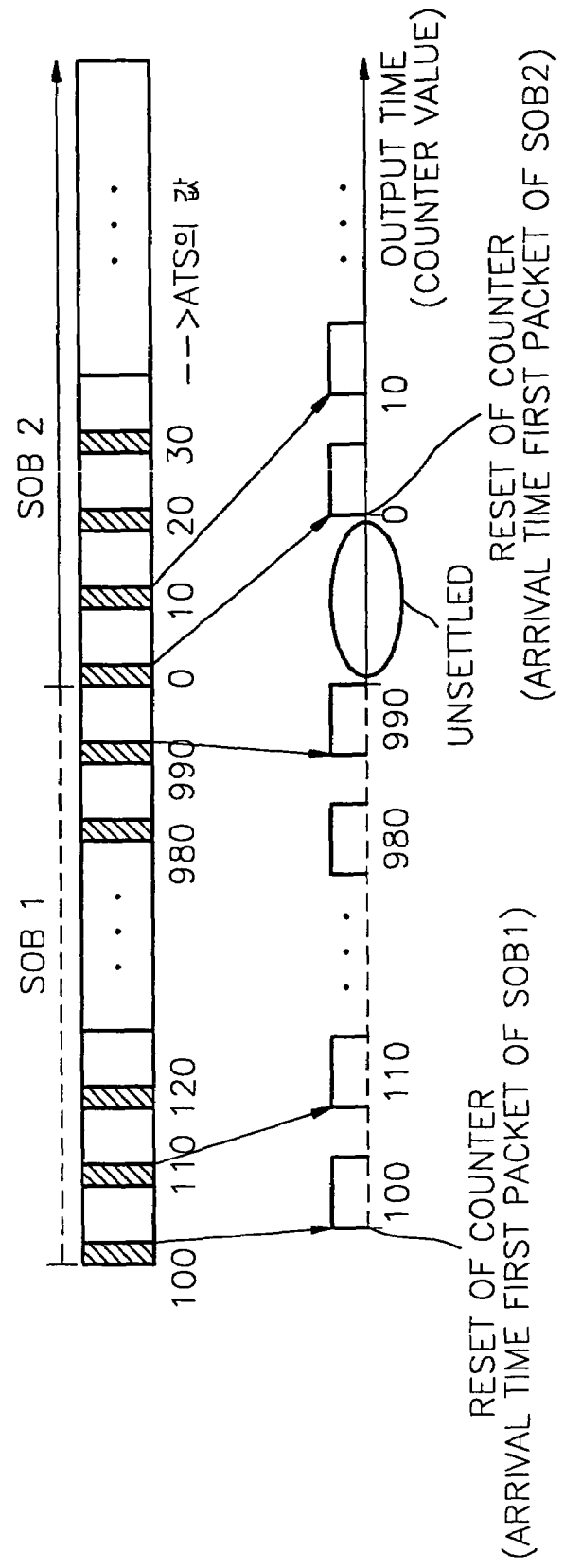
FIG. 3 is a view for explaining an example of a conventional method for reproducing two data streams (stream objects (SOBs))

FIG. 6 is a view for explaining discontinuous playback between two data streams when seamless information according to the present invention indicates "non-seamless playback." When seamless information indicates "non-seamless playback," after completing output of a preceding data stream, SOB 1, a counter is reset to the value of the ATS of the first packet of a succeeding data stream SOB 2 and playback of the SOB 2 is performed. Accordingly, the playback is temporarily stopped for an arbitrary amount of time as in the conventional method shown in FIG. 3. In this situation, seamless time control information (RT/offset/gap length) is ignored. Even if the values of RT/offset/gap length have been stored as the seamless time control information, the values are neglected.

Figure 7:
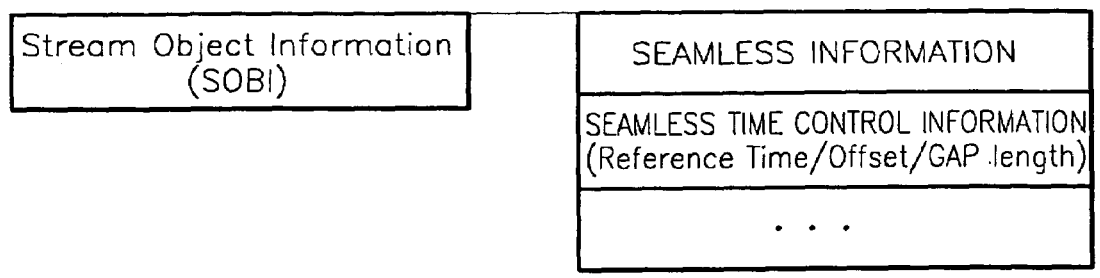
FIG. 7 shows an example of the structure of data stream information (SOB information (SOBI)) according to the present invention.

FIG. 7 shows an example of the structure of SOBI according to the present invention. SOBI, which is an important feature of the present invention, includes seamless information and seamless time control information. The seamless information may indicate "seamless playback" or "non-seamless playback." The seamless time control information includes a RT, an offset value and/or a gap length value.

The seamless time control information (RT/offset/gap length) is used only when the seamless information has a value indicating "seamless playback." In other words, when sequentially reproducing two data streams, SOB 1 and SOB 2, the seamless time control information is used for indicating an accurate output time of SOB 2 for the purpose of guaranteeing seamless playback at the boundary between the SOB 1 and the SOB 2. For example, when the counting operation of a counter, which has performed the counting operation during the playback of SOB 1, is to be maintained during playback of SOB 2, a time at which the first packet of the SOB 2 must be output, that is, a RT, is used, or a value (offset) of the difference between an ATS corresponding to the RT and an original ATS of the first packet of SOB 2 is used to determine the accurate output time of SOB 2. Alternately, a gap length, which indicates a time interval from a time when the last packet of SOB 1 is output through a time when the counter is reset to an arrival time of the first packet of SOB 2, may be used.

Figure 8:
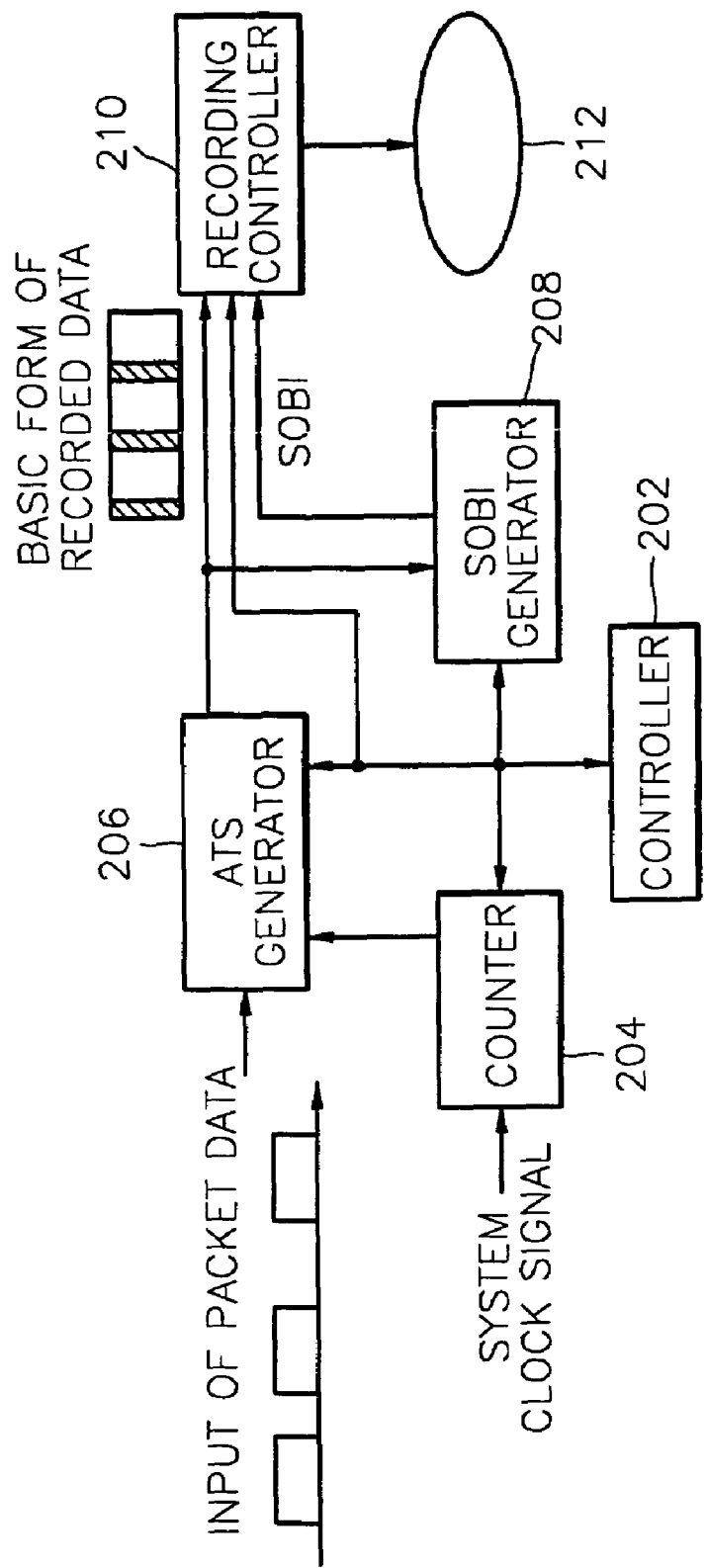
FIG. 8 is a block diagram of a recording/editing apparatus according to an embodiment of the present invention.

FIG. 8 is a block diagram of a recording/editing apparatus according to an embodiment of the present invention. The recording/editing apparatus includes a controller 202; a counter 204 driven by a system clock signal; an ATS generator 206 for receiving packet data and adding an ATS to the received packet data; an SOBI generator 208; and a recording controller 210 for recording the received packet data to which the ATS has been added and an SOBI generated by the SOBI generator 208, in a recording medium 212. The SOBI generator 208 generates SOBI for guaranteeing seamless playback of SOBs which are recorded with added ATSs. The SOBI generator 208 can be implemented in the form of software operating in the controller 202.

During recording, the controller 202 resets the counter 204 when starting the recording. Thereafter, packet data is received and recorded. At the time when packet data is received, the ATS generator 206 establishes the count value of the counter 204 as the ATS of the corresponding packet data and adds the ATS to the packet data. The packet data with the added ATS is stored in the recording medium 212 via the recording controller 210. Other additional information may be recorded together with the packet data and ATS to comply with the characteristics of a recording medium.

For example, when the characteristics of a recording medium require the management of data in units of 2048 bytes (a pack), to record packet data with an ATS while complying with the characteristics of the recording medium, extra header data will be added and recorded. For clarity, extra header data other than the ATS will not be presented in the description of the present invention. Meanwhile, for use in personal computers, a plurality of recorded SOBs may be all combined into a single file or they may be individually made into a plurality of files.

As shown in FIG. 7, the SOBI generator 208 generates SOBI including seamless information and seamless time control information having a RT, an offset value and/or a gap length value. At the end of recording, under the control of the controller 202, the recording of a packet data stream to which ATSs have been added is terminated and SOBI, which is generated by the SOBI generator 208, is recorded on the recording medium 212. In the recording medium 212, the area in which the SOB is recorded is named a first area, and the area in which the SOBI is recorded is named a second area.

In short, during a recording operation, the SOBI generator 208 generates SOBI and records it in a recording medium along with a corresponding SOB. Thereafter, editing may be performed using an editing apparatus and SOBI may be modified to guarantee seamless playback. The editing apparatus has the same structure as the recording apparatus. The SOBI generator corresponds to a SOBI updator in the editing apparatus. After editing by the editing apparatus, the SOBI updator analyzes the data stream information and updates seamless time control information so that data at either side of the boundary between data streams, at which seamless playback is not guaranteed, can be seamlessly played back. The recording controller 210 corresponds to an editing controller in the editing apparatus. The editing controller performs control such that edited data streams are recorded in a first area of a recording medium and updated data stream information is recorded in a second area of the recording medium.

Figure 9:
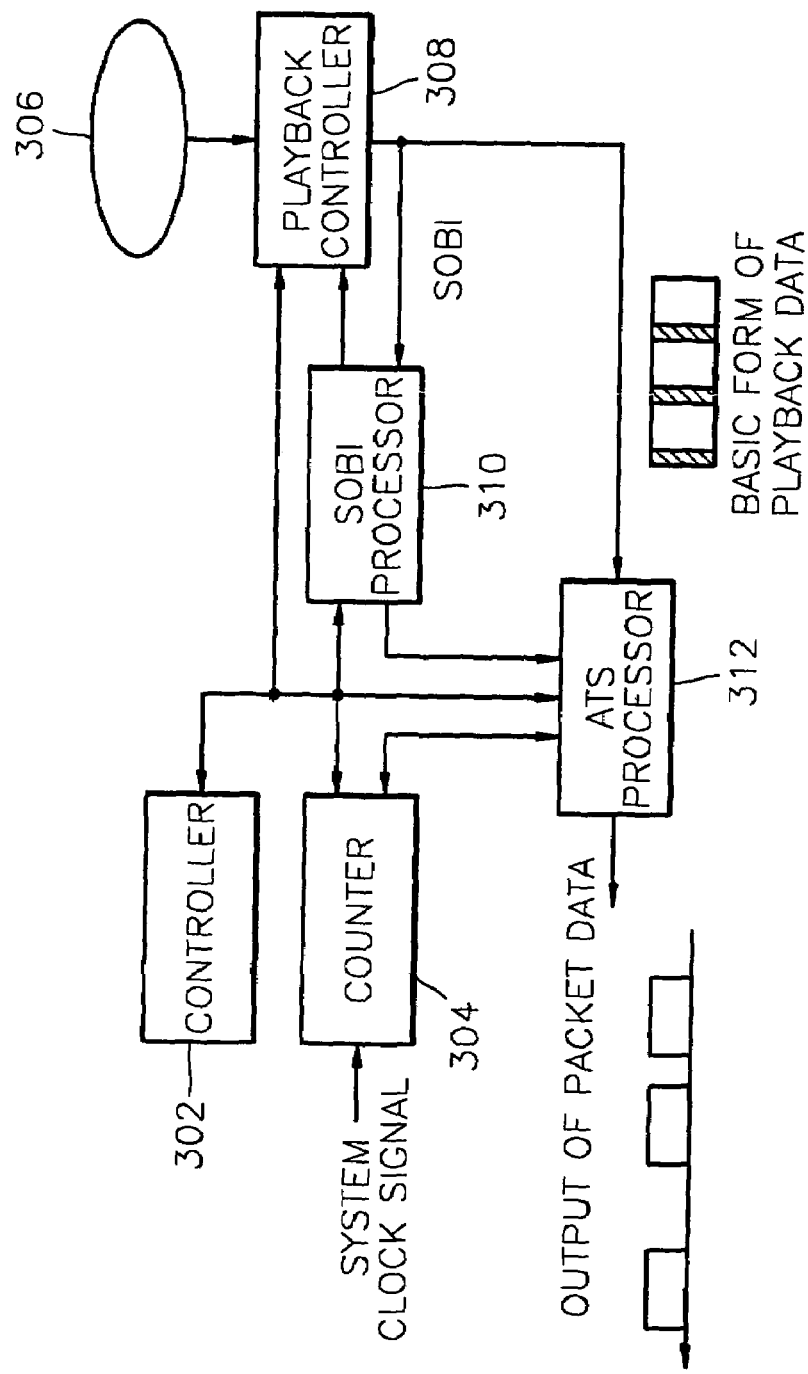
FIG. 9 is a block diagram of a playback apparatus according to an embodiment of the present invention.

FIG. 9 is a block diagram of a playback apparatus according to an embodiment of the present invention. The playback apparatus includes a controller 302; a counter 304 which is driven by a system clock signal; a playback controller 308 for reading SOBs and SOBI corresponding to the SOBs, from a recording medium 306; an SOBI processor 310, which reads the SOBI from the playback controller 308 and determines the value of the ATS of the first packet of a succeeding SOB to allow seamless playback at the boundaries between current and succeeding SOBs or control a time at which the counter 304 is reset; and an ATS processor 312. The SOBI processor 310 and the ATS processor 312 can be referred to as a first processor and a second processor, respectively. The SOBI processor 310 can be implemented in the form of software which is installed in the controller 302.

More specifically, during playback, SOBs which have been recorded in a recording medium are sequentially read. Read packet data to which ATSs have been added is provided to the ATS processor 312. The ATS processor 312 resets the counter 304 to a value of the ATS of packet data which is first received and, simultaneously, outputs the corresponding first packet data. Thereafter, the ATS processor 312 compares the values of the ATSs of packet data with the count value of the counter 304 and outputs a corresponding packet data when the count value is equal to the value of the ATS of the corresponding packet data.

Once output of a single SOB is completed, the SOBI processor 310 reads the SOBI of a succeeding SOB. When it is determined from seamless information and seamless time control information that a value indicating "seamless playback" has been established, as described in FIGS. 5B and 5C, the SOBI processor 310 determines a time when the first packet data of the succeeding SOB is to be output or a time at which the counter 304 is to be reset, using the seamless time control information, and then provides the determined time to the controller 302 and the ATS processor 312. The controller 302 performs control to output the first packet data of the succeeding SOB at the time which is determined according to the seamless time control information, as described above, while resetting the counter 304 to a particular time or maintaining the operation of the counter 304. Alternately, when it is determined that a value indicating "non-seamless playback" has been established, as described in FIG. 6, the seamless time control information is ignored.

Figure 10:
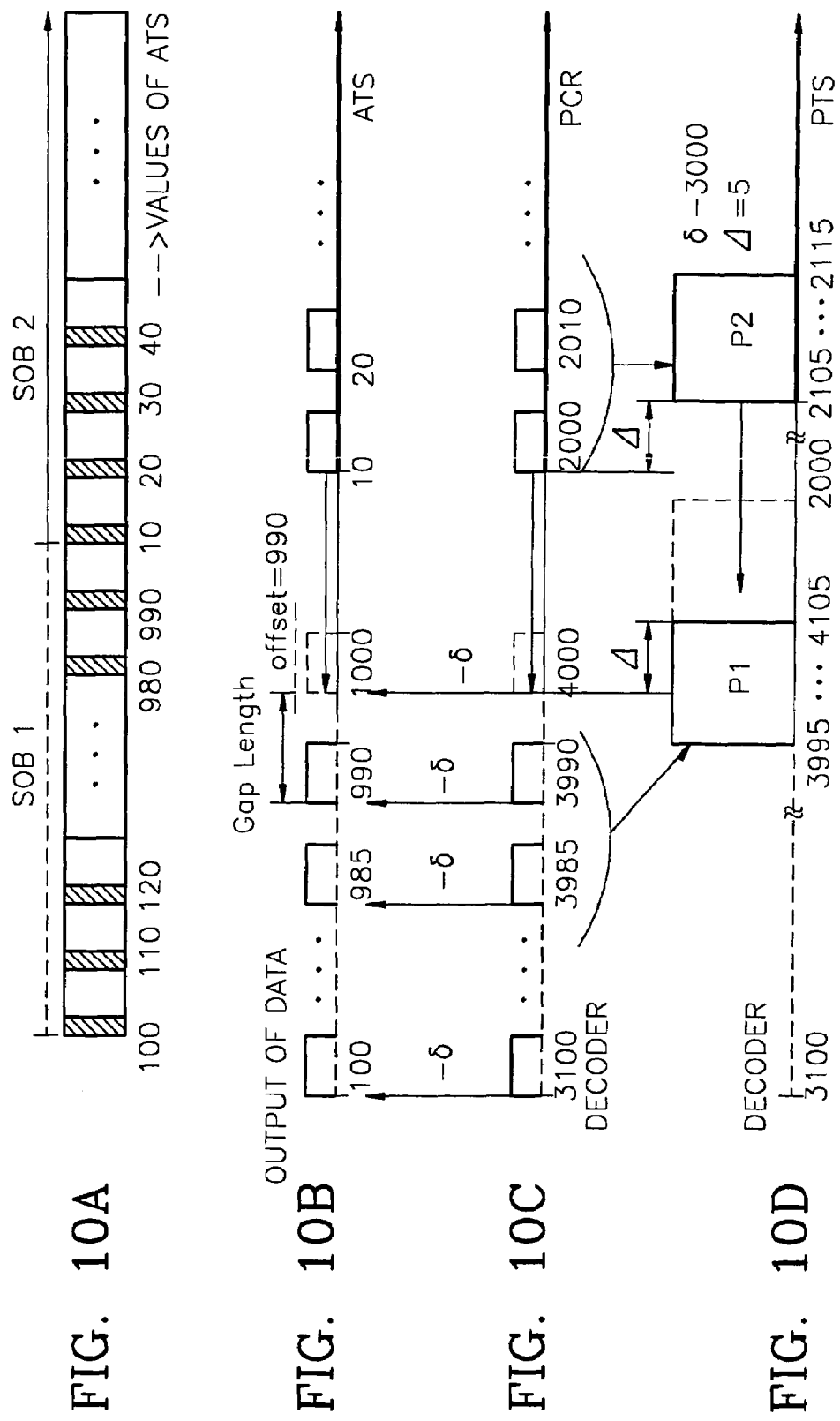
FIGS. 10A through 10D show correlation among an arrival time stamp (ATS), a program clock reference signal (PCR) value and a presentation time stamp (PTS) in moving picture experts group-transport stream (MPEG-TS) data and a method for obtaining an offset according to the present invention.

FIGS. 10A through 10D show how to accurately derive seamless time control information (RT) in a data stream which is coded in an MPEG-TS, MPEG-1 or MPEG-2 format. FIG. 10A shows the form of programs, which are recorded by a recording/playback apparatus, based on ATSs and packets. According to the MPEG-TS structure, each packet has a program clock reference (PCR) value and a presentation time stamp (PTS) value. The PCR value is a value which the counter has at the moment when a packet is input to the buffer of a receiving party having a decoder and is conceptionally the same as an ATS value. However, while a PCR value is contained in packet data and every packet does not have a PCR value, an ATS value is externally added to packet data and usually added to every packet.

ATS and PCR, which are respectively shown in FIGS. 10B and 10C, are information indicating arrival times so that the ATS values and the PCR values are in a one-to-one correspondence in predetermined time intervals δ in a single SOB when a clock signal used for generating ATS values is synchronized with MPEG-TS coded data. PTS values shown in FIG. 10D are also values which are used in the MPEG-TS coded data. For example, a PTS value indicates a time when a single picture is to be presented. Generally, a single picture is composed of a plurality of packet data. The PTS of the picture is embedded in a packet including the start of the corresponding picture data and has a value which is slightly behind the PCR value of the corresponding packet.

When seamless time control information for guaranteeing seamless playback of two SOBs is to be obtained, primarily, the meaning of seamless playback must be defined. In a case of reproducing MPEG video data, seamless playback means that a last picture P1 of a preceding data stream, SOB 1, must be immediately followed by a first picture P2 of a succeeding data stream, SOB 2, so that the picture P2 can be sequentially output following the picture P1. A new PTS of the picture P2 can be obtained by adding a duration of one frame of the picture P1 to the PTS of the picture P1. Assuming that the difference between the PTS of the picture P2 and the PCR of the first packet of the SOB 2 is represented by Δ, a new PCR of the picture P2 must arrive at the buffer of the receiving party in advance of the new PTS of the picture P2, by an amount of time Δ. Accordingly, the value (4000 in FIG. 10C) of the new PCR of the picture P2 can be obtained.

Since PCR values and ATS values are in a one-to-one correspondence in the predetermined intervals δ in SOB 1, a new value of the ATS of the first packet of SOB 2 can be obtained from the new PCR of the picture P2 and the value δ, that is, the new value of the first ATS of SOB 2 is obtained by adding the value δ to the value of the new PCR of the picture P2. The new value of the first ATS of SOB 2 is a counter value at which the first packet data of the SOB 2 is to be output to sequentially output the picture P2, when the counting operation of the counter 304 is maintained after the last packet data of SOB 1 is output. The counter value corresponding to the new value of the first ATS of the SOB 2 is referred to as a RT in this description. An offset value is a value of the difference between the RT and the value of the ATS of the first packet of SOB 2. A gap length value is a value of the difference between the RT and a value of the ATS of the last packet of SOB 1. Just one value among the RT, offset and gap length values may be used to derive the other values.

FIGS. 10A through 10D show the simplest method of obtaining an offset value. Actually, to obtain an offset value, as well as the temporal relations in playback operation, a buffer condition should be considered because the coded data must sometimes be re-encoded according to the buffer condition. In a case where SOBIs for guaranteeing seamless playback between SOBs have been written during recording, in a method in which a counter is not reset during playback, the counting operation of the counter is maintained after reproducing a SOB; an offset value contained in SOBI corresponding to a succeeding SOB is added to original values of ATSs of the corresponding, succeeding SOB; and the new values of the ATSs of the succeeding SOB are used for seamless playback between the two SOBs. Alternately, in a method in which a counter is reset during playback, the counter is reset between SOBs based on a gap length value.

Figure 11:
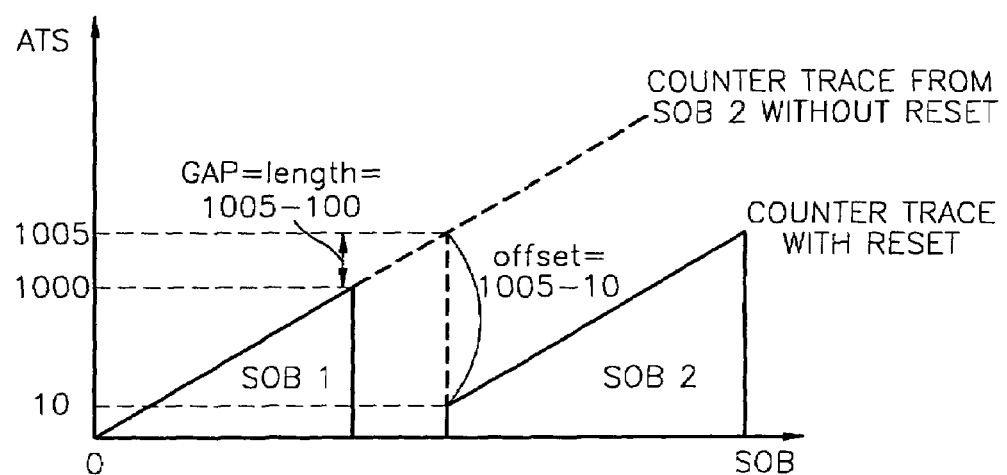
FIG. 11 is a view for explaining correlation among a reference time, an offset value and a gap length value during seamless playback according to the present invention, and their relation with a counter value.

FIG. 11 is a view for explaining the correlation among a RT, an offset and a gap length to give understanding of the present invention. In FIG. 11, the horizontal direction indicates file areas of SOBs and the vertical direction indicates ATSs which are added to packet data. A counter trace without reset and a counter trace with reset are also illustrated.

As shown in FIG. 11, after outputting a first data stream, SOB 1, without reset of a counter, an offset (=1005−10=995 in FIG. 11) is added to original ATSs of a second data stream, SOB 2, so as to perform seamless playback of SOB 2. Alternately, a counter is reset to a value of the ATS of the first packet of SOB 2 at a RT which is later than an ATS of the last packet of the SOB 1 by a gap length (=1005−1000=5 in FIG. 11) so as to perform seamless playback of SOB 2.

In the above description, a recording/editing apparatus and a playback apparatus are separately implemented as shown in FIG. 8 and FIG. 9, respectively. However, the present invention may be applied to a recording and playback apparatus in which all the elements depicted in FIGS. 8 and 9 are included and a counter, which is driven by a system clock signal, and a controller are used in common.

According to the present invention, data streams can be seamlessly reproduced without interruption between the data streams by using data stream information which includes seamless information and/or seamless time control information (RT/offset/gap length). Particularly, by using the information structure according to the present invention, even if data streams are edited, the data streams can be seamlessly reproduced in such a simple manner of just modifying data stream information, instead of directly rewriting or modifying ATSs, which are added to packet data.

What is claimed is:

1. A method to generate additional information to guarantee seamless playback, the method comprising:
generating data stream information for each of two or more data streams having packet data to which information on an arrival time of the respective packet data is added, the data stream information including seamless time control information and seamless playback information, which indicates whether a corresponding data stream is to be seamlessly reproduced after playback of a preceding data stream, or the seamless time control information, without the seamless playback information, to control an output time of the corresponding data stream to be seamlessly reproduced, wherein the seamless time control information includes a reference time, with the reference time being an output time of a first packet data of the corresponding data stream to be seamlessly reproduced; and outputting the generated data stream information to a medium.

2. A method to generate additional information to guarantee seamless playback, the method comprising:

generating data stream information for each of two or more data streams having packet data to which information on an arrival time of the respective packet data is added, the data stream information including seamless time control information to control an output time of a corresponding data stream to be seamlessly reproduced, or the seamless time control information and seamless playback information, the seamless playback information indicating whether the corresponding data stream is to be seamlessly reproduced after playback of a preceding data stream, wherein the seamless time control information includes an offset information, with the offset information being a value of a difference between an original arrival time of a first packet of the corresponding data stream to be seamlessly reproduced and an output time of the first packet of the corresponding data stream; and outputting the generated data stream information to a medium.

3. A method to generate additional information to guarantee seamless playback, the method comprising:

generating data stream information for each of two or more data streams having packet data to which information on an arrival time of the respective packet data is added, the data stream information including seamless time control information to control an output time of a corresponding data stream to be seamlessly reproduced, or the seamless time control information and seamless playback information, the seamless playback information indicating whether the corresponding data stream is to be seamlessly reproduced after playback of a preceding data stream, wherein seamless time control information includes gap length information, with the gap length information being a value of an amount of time from an output time of a last packet of the preceding data stream to an output time of a first packet of the corresponding data stream to be seamlessly reproduced; and outputting the generated data stream information to a medium.

4. The method of claim 3, wherein the seamless time control information is valid only when the seamless information has a value indicating "seamless playback."

5. The method of claim 3, wherein each of the data streams includes a plurality of packs, each pack including the packet data to which information on the arrival time of the respective packet data is added, and an extra header which is added to the packet data with arrival time information.

6. A method to guarantee seamless playback of data streams, comprising:

generating data stream information for each of two or more data streams, each data stream having packet data including information on an arrival time of the respective packet data, the data stream information including seamless time control information to control an output time of a corresponding data stream to be seamlessly reproduced, or the seamless time control information and seamless playback information, the seamless playback information indicating whether the corresponding data stream is to be seamlessly reproduced after playback of a preceding data stream; and generating seamless playback of the two or more data streams based on the data stream information, wherein the seamless time control information includes a reference time, with the reference time being an output time of a first packet data of the corresponding data stream to be seamlessly reproduced.

7. A method to guarantee seamless playback of data streams, comprising:

generating data stream information for each of two or more data streams, each data stream having packet data including information on an arrival time of the respective packet data, the data stream information including seamless time control information to control an output time of a corresponding data stream to be seamlessly reproduced, or the seamless time control information and seamless playback information, the seamless playback information indicating whether the corresponding data stream is to be seamlessly reproduced after playback of a preceding data stream; and generating seamless playback of the two or more data streams based on the data stream information, wherein the seamless time control information includes offset information, with the offset information being a value of a difference between an original arrival time of a first packet of the corresponding data stream to be seamlessly reproduced and an output time of the first packet of the corresponding data stream.

8. A method to guarantee seamless playback of data streams, comprising:

generating data stream information for each of two or more data streams, each data stream having packet data including information on an arrival time of the respective packet data, the data stream information including seamless time control information to control an output time of a corresponding data stream to be seamlessly reproduced, or the seamless time control information and seamless playback information, the seamless playback information indicating whether the corresponding data stream is to be seamlessly reproduced after playback of a preceding data stream; and generating seamless playback of the two or more data streams based on the data stream information, wherein the seamless time control information includes gap length information, with the gap length information being a value of an amount of time from an output time of a last packet of the preceding data stream to an output time of a first packet of the corresponding data stream to be seamlessly reproduced.

9. The method of claim 8, wherein the seamless time control information is valid only when the seamless information has a value indicating "seamless playback."

10. The method of claim 8, wherein each of the data streams includes a plurality of packs, each pack including the packet data to which information on the arrival time of the respective packet data is added, and an extra header which is added to the packet data with arrival time information.

11. The method of claim 8, wherein the seamless time control information further includes a reference time and/or offset information, with the reference time being the output time of the first packet of the corresponding data stream, and the offset information being a value of a difference between an original arrival time of the first packet of the corresponding data stream and the output time of the first packet of the corresponding data stream.

12. The method of claim 3, wherein the seamless time control information further includes a reference time and/or offset information, with the reference time being the output time of the first packet of the corresponding data stream, and the offset information being a value of a difference between an original arrival time of the first packet of the corresponding data stream and the output time of the first packet of the corresponding data stream.

13. A method to generate additional information to guarantee seamless playback, the method comprising:
generating data stream information for each of two or more data streams, each data stream having packet data including information on an arrival time of the respective packet data, the data stream information including seamless time control information to control an output time of a corresponding data stream to be seamlessly reproduced, or the seamless time control information and seamless playback information, the seamless playback information indicating whether the corresponding data stream is to be seamlessly reproduced after playback of a preceding data stream,
wherein the seamless time control information includes a reference time, offset information and/or gap length information, with the gap length information being a value of an amount of time from an output time of a last packet of the preceding data stream to an output time of a first packet of the corresponding data stream to be seamlessly reproduced; and
reproducing the two or more data streams based on the generated data stream information.

14. The method of claim 13, wherein the reference time is the output time of the first packet of the corresponding data stream, and the offset information is a value of a difference between an original arrival time of the first packet of the corresponding data stream and the output time of the first packet of the corresponding data stream.

15. The method of claim 13, wherein the seamless time control information is valid only when the seamless information has a value indicating "seamless playback."

16. The method of claim 13, wherein each of the data streams includes a plurality of packs, each pack including the packet data to which information on the arrival time of the respective packet data is added, and an extra header which is added to the packet data with arrival time information.

* * * * *